(12) United States Patent
Yang et al.

(10) Patent No.: US 12,112,263 B2
(45) Date of Patent: Oct. 8, 2024

(54) REVERSAL-POINT-BASED DETECTION AND RANKING

(71) Applicant: Microsoft Technology Licensing, LLC, Redmond, WA (US)

(72) Inventors: Bo Yang, Brighton, MA (US); Chaofan Huang, Atlanta, GA (US); Songtao Guo, Cupertino, CA (US); Robert Perrin Reeves, Castro Valley, CA (US); Wan Qi Gao, San Francisco, CA (US); Patrick Ryan Driscoll, Oakland, CA (US); Kristina Caroline Ryan, San Francisco, CA (US); Michael Mario Jennings, San Francisco, CA (US); Jeremy Lwanga, San Francisco, CA (US); Manzarul Azad Kazi, Walnut Creek, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 969 days.

(21) Appl. No.: 17/116,184

(22) Filed: Dec. 9, 2020

(65) Prior Publication Data

US 2022/0180181 A1 Jun. 9, 2022

(51) Int. Cl.
*G06N 3/08* (2023.01)
*G06F 18/20* (2023.01)
(Continued)

(52) U.S. Cl.
CPC ........... *G06N 3/08* (2013.01); *G06F 18/2113* (2023.01); *G06F 18/2163* (2023.01);
(Continued)

(58) Field of Classification Search
CPC .................................. G06N 3/08; G06F 18/29
See application file for complete search history.

(56) References Cited

U.S. PATENT DOCUMENTS

| 7,836,111 B1 * | 11/2010 | Shan ...................... G06Q 40/04 |
| | | 708/200 |
| 10,200,262 B1 * | 2/2019 | Leverich ............. H04L 63/1425 |
| (Continued) | | |

FOREIGN PATENT DOCUMENTS

| CN | 111708678 A | 9/2020 |
| CN | 111275288 A | 12/2023 |

OTHER PUBLICATIONS

Yong Ge, Guofei Jiang, Min Ding, and Hui Xiong. 2014. Ranking Metric Anomaly in Invariant Networks. ACM Trans. Knowl. Discov. Data 8, 2, Article 8 (Jun. 2014), 30 pages. https://doi.org/10.1145/2601436 (Year: 2014).*

(Continued)

*Primary Examiner* — Andrew L Tank
(74) *Attorney, Agent, or Firm* — KDW FIRM PLLC

(57) ABSTRACT

In an example embodiment, a model is trained to specifically identify reversal points in data and then to rank these reversal points in order of importance. A reversal point shall be defined as a point in which a particular metric, specifically a first order derivative, crosses over from positive to negative or vice-versa. Users are more likely to be interested in abnormal and significant changes in data, and thus the machine-learned model is trained to evaluate a reversal point based on two dimensions: abnormality and significance.

18 Claims, 9 Drawing Sheets

(51) Int. Cl.
  G06F 18/21 (2023.01)
  G06F 18/2113 (2023.01)
  G06F 18/25 (2023.01)
(52) U.S. Cl.
  CPC ............ G06F 18/217 (2023.01); G06F 18/25 (2023.01); G06F 18/29 (2023.01)

(56) References Cited

U.S. PATENT DOCUMENTS

| | | | |
|---|---|---|---|
| 10,558,767 | B1 | 2/2020 | Natarajan |
| 11,281,969 | B1 | 3/2022 | Rangapuram et al. |
| 11,636,377 | B1* | 4/2023 | Xu .......................... G06N 3/044 706/12 |
| 2014/0279775 | A1 | 9/2014 | Chu |
| 2016/0321616 | A1 | 11/2016 | Gedge |
| 2018/0246797 | A1* | 8/2018 | Modi ............... G06Q 10/06398 |
| 2019/0057197 | A1 | 2/2019 | Wang |
| 2019/0362245 | A1 | 11/2019 | Buda |
| 2020/0005096 | A1 | 1/2020 | Calmon |
| 2020/0035001 | A1* | 1/2020 | Pang ...................... G06T 11/001 |
| 2021/0097191 | A1 | 4/2021 | Howell |
| 2021/0124983 | A1* | 4/2021 | Axenie .................. G06N 20/00 |
| 2022/0027257 | A1* | 1/2022 | Harutyunyan ........... G06N 5/01 |
| 2022/0198263 | A1 | 6/2022 | Guo et al. |
| 2022/0198264 | A1 | 6/2022 | Guo et al. |
| 2022/0245013 | A1 | 8/2022 | Ciabarra, Jr. et al. |

OTHER PUBLICATIONS

Li, D., Chen, D., Shi, L., Jin, B., Goh, J. and Ng, S.K., 2019. MAD-GAN: Multivariate Anomaly Detection for Time Series Data with Generative Adversarial Networks. arXiv preprint arXiv: 1901. 04997. (Year: 2019).*
A. Mason, Y. Zhao, H. He, R. Gompelman and S. Mandava, "Online Anomaly Detection of Time Series at Scale," 2019 International Conference on Cyber Situational Awareness, Data Analytics And Assessment (Cyber SA), Oxford, UK, 2019, pp. 1-8, doi: 10.1109/ CyberSA.2019.8899398. (Year: 2019).*
M. Munir, S. A. Siddiqui, A. Dengel and S. Ahmed, "DeepAnT: A Deep Learning Approach for Unsupervised Anomaly Detection in Time Series," in IEEE Access, vol. 7, pp. 1991-2005, 2019, doi: 10.1109/ACCESS.2018.2886457. (Year: 2019).*
K. Xu, et al., "CloudDet: Interactive Visual Analysis of Anomalous Performances in Cloud Computing Systems" in IEEE Transactions on Visualization & Computer Graphics, vol. 26, No. 01, pp. 1107-1117, 2020. doi: 10.1109/TVCG.2019.2934613 (Year: 2020).*
"Anomaly Detection", Retrieved From: https://github.com/twitter/ AnomalyDetection, Retrieved on: Nov. 19, 2020, 5 Pages.
"Automated Insights", Retrieved from: http://www.automatedinsights. com/, Retrieved on Oct. 22, 2020, 5 Pages.
"Autoregressive Integrated Moving Average", Retrieved from: https:// en.wikipedia.org/wiki/Autoregressive_integrated_moving_ average, Retrieved on: Nov. 19, 2020, 6 Pages.
"Detection of Outliers", Retrieved From: https://www.itl.nist.gov/ div898/handbook/eda/section3/eda35h.htm, Retrieved on: Nov. 19, 2020, 4 Pages.
"Ergodiclife / Eif", Retrieved From https://github.com/ergodiclife/ eif, Retrieved on: Nov. 19, 2020, 10 Pages.
"Error function", Retrieved from: https://en.wikipedia.org/wiki/ Error_function, Retrieved on Oct. 28, 2020, 14 Pages.
"Generalized ESD Test for Outliers", Retrieved From: https://www. itl.nist.gov/div898/handbook/eda/section3/eda35h3.htm, Retrieved on: Nov. 19, 2020, 3 Pages.
"Grubbs' Test for Outliers", Retrieved From https://www.itl.nist. gov/div898/handbook/eda/section3/eda35h1.htm, Retrieved on: Nov. 19, 2020, 3 Pages.
"Hadoop Streaming", Retrieved From: https://hadoop.apache.org/ docs/r1.2.1/streaming.html, Oct. 10, 2020, 9 Pages.

"Half-Normal Distribution", Retrieved from: https://en.wikipedia. org/wiki/Half-normal_distribution, Retrieved on: Oct. 28, 2020, 3 Pages.
"Narrative Science", Retrieved From: https://narrativescience.com/, Retrieved on: Nov. 19, 2020, 6 Page.
"Isolation Forest", Retrieved From https://en.wikipedia.org/wiki/ Isolation_forest, Retrieved on Oct. 22, 2020, 5 Pages.
"Lexio: 3 Minute Demo", Retrieved From: https://narrativescience. com/resource/video/lexio-demo/, Retrieved on: Nov. 19, 2020, 6 Pages.
"Modified Z Score", Retrieved From: https://www.ibm.com/support/ knowledgecenter/en/SSEP7J_11.1.0/com.ibm.swg.ba.cognos.ug_ca_ dshb.doc/modified_z.html, Retrieved on: Oct. 22, 2020, 3 Pages.
"References For Chapter 1: Exploratory Data Analysis", Retrieved From https://www.itl.nist.gov/div898/handbook/eda/section4/eda43. htm#Rosner, Retrieved on: Nov. 19, 2020, 5 Pages.
"Rethink how you Communicate Dashboards", Retrieved From: https://narrativescience.com/quill, Retrieved on: Nov. 19, 2020, 12 Pages.
"Runmed", Retrieved From: https://www.rdocumentation.org/ packages/stats/versions/3.6.2/topics/runmed, Retrieved On: Nov. 19, 2020, 4 Pages.
"Sign (mathematics)", Retrieved from: https://en.wikipedia.org/wiki/ Sign_(mathematics), Retrieved on: Oct. 28, 2020, 5 Pages.
"Standard Deviation", Retrieved from: https://en.wikipedia.org/wiki/ Standard_deviation, Retrieved On: Oct. 28, 2020, 17 Pages.
"Stationary Point", Retrieved from: https://en.wikipedia.org/wiki/ Stationary_point, Retrieved On: Oct. 28, 2020, 3 Pages.
"Stock Portfolio Recap", Retrieved From: https://wordsmith. automatedinsights.com/gallery/stock-portfolio-recap, Feb. 11, 2016, 2 Pages.
"The Wordsmith Gallery", Retrieved From https://web.archive.org/ web/20201105232445/https://wordsmith.automatedinsights.com/ gallery, Retrieved on: Nov. 19, 2020, 8 Pages.
"Tietjen-Moore Test for Outliers", Retrieved From: https://www.itl. nist.gov/div898/handbook/eda/section3/eda35h2.htm, Retrieved on: Nov. 19, 2020, 3 Pages.
"Welcome to the Wordsmith Knowledge Base", Retrieved From: https://wordsmithhelp.readme.io/docs/welcome-to-the-wordsmith- knowledge-base, Retrieved on: Oct. 22, 2020, 1 Page.
Cleveland, et al., "STL: A Seasonal-Trend Decomposition Procedure Based on Loess", In Journal of Official Statistics, vol. 6, Issue 1, Mar. 1990, pp. 3-73.
Gentle, James E., "Mining for Patterns in Financial Time Series", In Joint Statistical Meetings, Jul. 29, 2012, 11 Pages.
Hyndman, Rob J., "Forecast", Retrieved From https://github.com/ robjhyndman/forecast/blob/master/R/mstl.R, Retrieved on: Oct. 22, 2020, 14 Pages.
Kiveris, et al., "Connected Components in MapReduce and Beyond", In Proceedings of the ACM Symposium on Cloud Computing, Nov. 3, 2014, 13 Pages.
Luedicke, Jeorg, "Friedman's Super Smoother", Retrieved From: https://fmwww.bc.edu/repec/bocode/s/supsmooth_doc.pdf, 2015, 7 Pages.
Schlampp, Pete, "Announcing Workday People Analytics: Leveraging the Strength of AI, Machine Learning, and Augmented Analytics", Retrieved From: https://blog.workday.com/en-us/2018/ announcing-workday-people-analytics-leveraging-the-strength-of- ai-machine-learning-and-augmented-analytics.html, Oct. 2, 2018, 10 Pages.
Ziegler, et al., "Improving Recommendation Lists Through Topic Diversification", In Proceedings of the 14th International Conference on World Wide Web, May 10, 2005, pp. 22-32.
"Exponential Smoothing", Retrieved from https://en.wikipedia.org/ wiki/Exponential_smoothing, Retrieved on: Nov. 19, 2020, 7 Pages.
"Automated Insights", Retrieved from: https://linkedin.invisionapp. com/boards/EX3U9NNS273/, Retrieved on: Nov. 19, 2020, 3 Pages.
Iglewicz, et al. "How to Detect and Handle Outliers", Published by ASQC Quality Press, 1993, 77 Pages.
"Median Absolute Deviation", Retrieved From: https://www. rdocumentation.org/packages/stats/versions/3.6.2/topics/mad, Retrieved On: Nov. 19, 2020, 3 Pages.

(56) References Cited

OTHER PUBLICATIONS

"SD Assessment Functions", Retrieved From: https://www.rdocumentation.org/packages/affy/versions/1.50.0/topics/SD, Retrieved On: Nov. 19, 2020, 2 Pages.

"Cross Validation—How to Split Dataset for Time-Series Prediction?—Cross Validated", Retrieve from: https://stats.stackexchange.com/questions/117350/how-to-split-dataset-for-time-series-prediction, Retrieved on Aug. 14, 2020, 4 pages.

"How Much Data Is Needed to Train a (Good) Model." Retrieve from: https://www.datarobot.com/blog/how-much-data-is-needed-to-train-a-good-model/, DataRobot AI Platform, Aug. 4, 2017, 4 pages.

"Robust Anomaly Detection + Seasonal-Trend Decomposition: Time Series Talk." https://www.youtube.com/watch?v=1NXryMoU7Ho, Aug. 17, 2020, 3 pages.

"Time Series—Optimal Forecast Window for Timeseries—Cross Validated." Retrieve from: https://stats.stackexchange.com/questions/174797/optimal-forecast-window-for-timeseries, retrieved on Oct. 29, 2020, 3 pages.

David, et al., "Fast and accurate yearly time series forecasting with forecast combinations", International Journal of Forecasting, vol. 36, Issue No. 1, 2020, pp. 116-120.

Non-Final Office Action mailed on Feb. 15, 2024, in U.S. Appl. No. 17/133,222, 27 pages.

Non-Final Office Action mailed on Jan. 19, 2024, in U.S. Appl. No. 17/133,259, 19 pages.

Oliveira, et al., "Detecting novelties in time series through neural networks forecasting with robust confidence intervals", Neurocomputing, vol. 70, Issue No. 1-3, May 18, 2006, pp. 79-92.

Notice of first examination opinion Received for Chinese Application No. 202111577183.X, mailed on Mar. 22, 2024, 18 pages.

Non-Final Office Action mailed on Jun. 6, 2024, in U.S. Appl. No. 17/133,222, 33 pages.

Final Office Action mailed on Jun. 12, 2024, in U.S. Appl. No. 17/133,259, 28 pages.

* cited by examiner

REVERSAL-POINT-BASED DETECTION AND RANKING

TECHNICAL FIELD

The present disclosure generally relates to technical problems encountered in machine learning. More specifically, the present disclosure relates to reversal-point-based detection and ranking.

BACKGROUND

The rise of the Internet has occasioned two disparate yet related phenomena: the increase in the presence of online networks, with their corresponding user profiles visible to large numbers of people, and the increase in the use of these online networks to provide content. Online networks are able to gather and track large amounts of data regarding various entities, including organizations and companies. For example, online networks are able to track users who transition from one company to another company and thus, in aggregate, these online networks are able to determine, for example, how many users have left a particular company in a particular time period. Additional details may be known and/or added to these types of metrics, such as which companies the users left the company for, and how many users have joined the particular company during the same time period. Additionally, there are many other metrics that online networks could determine about these companies that may be of interest to users.

An issue arises, however, in determining what to do with this information. There are so many potential metrics and values for the metrics that it can be difficult to determine which metric/value may be more important to convey to users.

An additional technical issue arises in the context of large online networks. Specifically, when dealing with large online networks, the amount of data to be analyzed is enormous. As such, any potential solution would need to be scalable to operate in large online networks.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
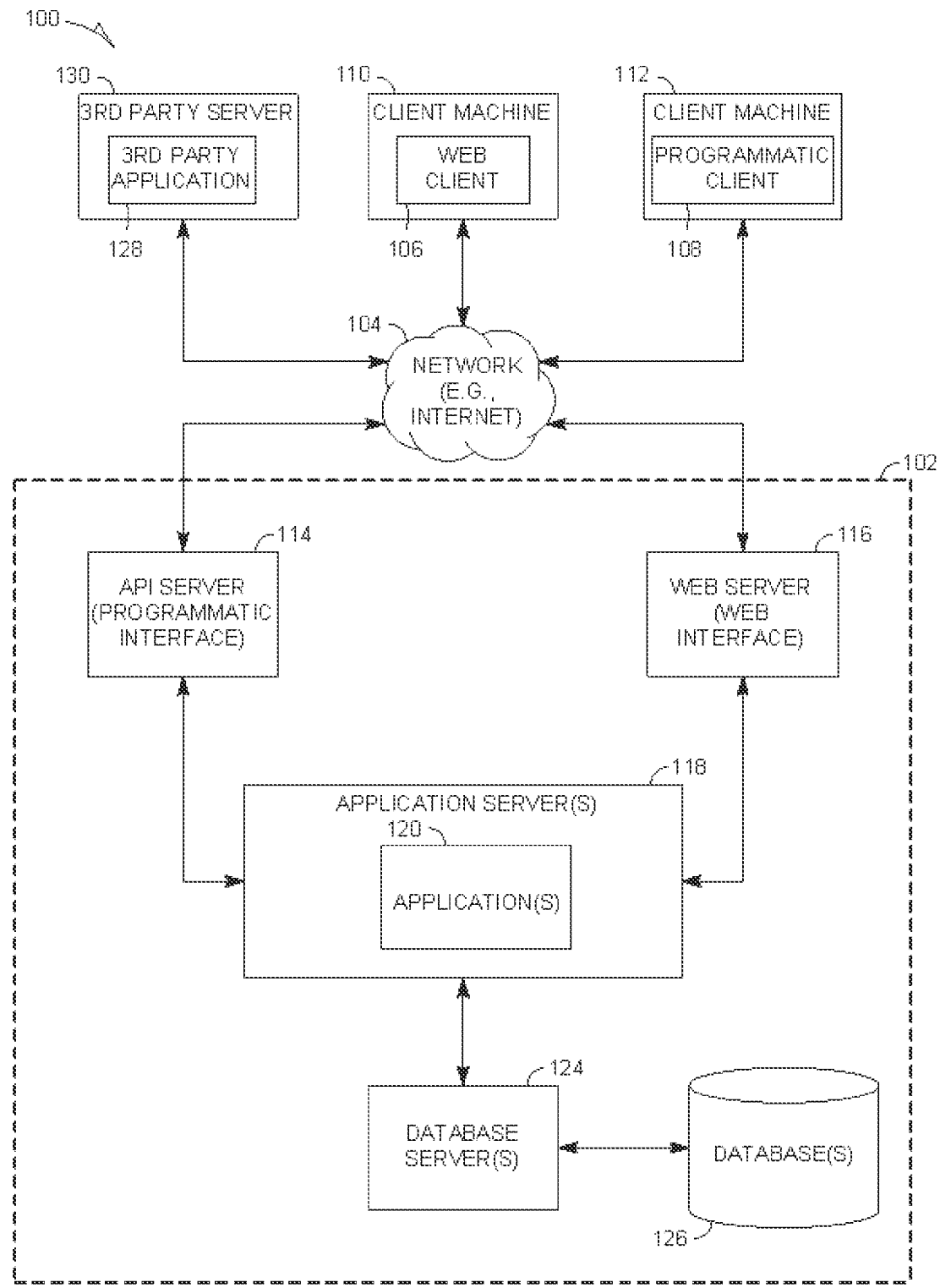
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a model is trained to specifically identify reversal points in data and then to rank these reversal points in order of importance. A reversal point shall be defined as a point in which a particular metric, specifically a first order derivative, crosses over from positive to negative or vice-versa. Users are more likely to be interested in abnormal and significant changes in data, and thus the machine-learned model is trained to evaluate a reversal point based on two dimensions: abnormality and significance.

Description

The disclosed embodiments provide a method, apparatus, and system for training a machine-learned model using a machine learning algorithm to rank reversal points in discrete time series. A discrete time series comprises data points separated by time intervals. These time intervals may be regular (e.g., once a month) or irregular (e.g., each time a user logs in). While this disclosure will provide specific examples where the time intervals are regular, one of ordinary skill in the art will recognize that there may be circumstances where the techniques described in the present disclosure can be applied to discrete time series with irregular time intervals.

In an example embodiment, reversal points within discrete time series are automatically detected using an algorithm that examines the sign of a first order derivative of the discrete time series data.

Specifically, discrete time points in a time series ($t_0$, $t_1$, $t_2$, ... $t_{n-2}$, $t_{n-1}$, $t_n$) may represent an ascending arithmetic sequence of dates, months, quarters, or years, for example, with $t_0 < t_1 < t_2 < \ldots t_{n-2} < t_{n-1} < t_n$, $\Delta t = t_i - t_{i-1}$. $f(t_i)$ is a discrete time series. The discrete time series may be a series of measurements or other values at a series of different time periods. For example, the discrete time series may be a measure of employee headcount (the number of employees at a company) at the end of each month for the past three years. $\Delta f(t_i)$ is a magnitude change time series, in other words a time series where the measurements/values are changes in the measurements/values of the original time series (for example, rather than showing overall headcount each month it shows the net gain or loss in headcount each month). It is defined as $f(t_i) - f(t_{i-1})$. $f'(t_i)$ is the first order derivative of a discrete time series such that $$f'(t_i) = \frac{f(t_i) - f(t_{i-i})}{t_i - t_{i-1}} = \frac{\Delta f(t_i)}{\Delta t}$$

where i>0.

Reversal point $(t_r, f(t_r))$ can then be defined where sign $(f'(t_r))$ reverses sign$(f'(t_{r-1}))$, or in other words sign $$\left(\frac{\Delta f(t_r)}{\Delta t}\right)$$

reverses sign $$\left(\frac{\Delta f(t_{r-1})}{\Delta t}\right),$$

or in other words sign$(\Delta f(t_r))$ reverses sign$(\Delta f(t_{r-1}))$ as $\Delta t$ is always positive, where, sign is a property of every real number being either positive, negative, or zero. Thus, this defines where positive and negative signs are reversed.

It should be noted that in cases where the value for the metric is exactly zero (i.e., neither positive or negative), the data may be transformed so that the value is either positive or negative. Specifically, a zero value will be changed to a positive value if the prior value (at the last time interval) was positive, and to a negative value if the prior value (at the last time interval) was negative.

Additionally, the magnitude change at the reversal point is $\Delta f(t_r)$, the previous trend $t_p = t_s, t_{s+1}, \ldots, t_{r-1}$ that sign$(\Delta f(t_p))$ reverses sign$(\Delta f(t_r))$, and the length of the previous trend $R = t_{r-1} - t_s$. A previous trend is defined as a number of measurement/value time points in which the sign of the measurement/value time points remained constant. For example, a previous trend may be an 11 month period where every month employee headcount increased, and the trend ended when there was one month where the employee headcount did not increase. Magnitude changes in the previous trend can be defined as $\Delta f(t_p)$, with absolute magnitude changes in the previous trend as $|\Delta f(t_p)|$. The maximum of the absolute magnitude changes in the previous trend can be defined as $\max(|\Delta f(t_p)|)$.

In certain circumstances, it may be beneficial to break up a discrete time series into a series of segments. In one example embodiment, each segment in a long discrete time series may then be analyzed individually, rather than analyze the entire discrete time series as a whole. In another example embodiment, a filtering criteria is applied so that only those segments that have not been filtered out by the filtering criteria are analyzed. For example, a filter may be applied based on widespread external events that may have made the measurements/values in certain segments to be less indicative of internal company changes, such as stay-at-home orders issued during a worldwide pandemic causing the company to need to temporarily lay off workers.

Regardless, the segment may cover multiple time intervals in the discrete time series. For example, if the metric in the data is net headcount changes on a monthly basis (the intervals in the data are monthly), the segment may cover the last year of data points (e.g., 13 data points, counting the present month's data). For a segment being analyzed, first a potential reversal point is first set as the last point in the segment of interest (e.g., N=13, where N is the total number of points in the segment). The length of the previous trend for the potential reversal point may be labeled as R, while the time series segment has a total of C actual reversal points. The length of the previous trend is the number of time points in a row between the potential reversal point and a previous reversal point (or the beginning of the segment). The number of reversal points is the number of time points in the discrete time series in which the first order derivative of the measurement/value changes from positive to negative or vice-versa. There are, therefore, three restrictions on N, R, and C:

$$1 <= R <= N-2$$

$$1 <= C <= N-2$$

$$N >= R+C+1$$

As described briefly earlier, users are more likely to be interested in abnormal and significant changes in data, and thus the algorithm is designed to evaluate a reversal point based on two dimensions; abnormality and significance. In terms of evaluating the abnormality of a reversal point, three factors may be used. The first is the length of the previous trend R, the second is the number of reversal points in the time series C, and the third is the number of time points in the discrete time series segment N. For the same N, the longer the previous trend length is and the less volatile the time series is, the more abnormal the insight is. Thus, for example, if employee headcount increased every month for 2 years until finally having a month where it decreased, this reversal point would be quite abnormal, whereas if employee headcount routinely increased or decreased slightly each month (e.g., one month it increased by 1, the next month it decreased by 1, and so on), then any particular reversal point would not be as abnormal.

In terms of evaluating the significance of a reversal point, two factors may be used. The first is the magnitude change at the reversal point $\Delta f(t_r)$. The second are the changes of magnitude in the previous trend $\Delta f(t_p)$. For example, employee headcount magnitude change for a company may have been small in December 2019 at a net of −14 (30 hires and 44 departures), but a great insight cannot be concluded by just looking at this small value. However, if this is compared with the value in November 2019 with a net of +123 (133 hires and 10 departures), the change appears quite large. To formalize this intuition, for the same $|\Delta f(t_r)|$, the higher the $|\Delta f(t_p)|$, the more significant the reversal point is, $\max(|\Delta f(x_p)|)$ is used to calculate a maximum difference between the reversal point and previous trend magnitude changes:

$$\Delta^2 f_{rp-max} = \max(|\Delta f(t_r) - \Delta f(t_p)|)$$

However, examining magnitude changes alone may not be enough because it is much easier for large companies to have relatively larger magnitude changes than middle and small companies. Therefore, the metric for a company for a specific subject of the time series, such as function, title, skills, or geographic location, at the reversal point, can also be used to evaluate the significance of a reversal point (e.g., headcount by subject $H_r$). Thus, for example, for a large company with hundreds of thousands of employees, an increase in headcount of a thousand in a month may not be that relevant, but if the metric was based on a specific subject, such as only employee headcount in California, or only employee headcount in the Human Resource department, or only employee headcount of employees with Java programming experience, the magnitude changes may be more relevant.

Therefore, in an example embodiment, a ranking algorithm may be provided that scores an identified reversal point in a discrete time series using the following formula:

$$S_{overall} = \alpha * S_{abnormality} + (1-\alpha) * S_{significance}$$

where $\alpha$ is a coefficient between 0 and 1.
The abnormality score may be computed as follows:

$$S_{abnormality} = \frac{1}{2} + \frac{R-C}{2N-4}$$

where $$0 < \frac{1}{2N-4} \le S_{abnormality} \le 1 - \frac{1}{2N-4} < 1.$$

$S_{abnormality}$ increases linearly with the previous trend length R.
$S_{abnormality}$ decreases linearly with the number of reversal points in the time series C.

The significance score may be computed as follows:

$$S_{significance} = \beta * S_{magnitude-diff} + (1-\beta) * S_{magnitude-diff-ratio}$$

where $\beta$ is a coefficient between 0 and 1. $S_{magnitude-diff}$ considers the maximum absolute value of the differences between the magnitude change at reversal point and those in the previous trend ($\Delta^2 f_{rp-max}$). It assumes that $\Delta^2 f_{rp-max} - 1$ roughly follows a half normal distribution and the cumulative distribution function of the half normal distribution was used to calculate a score:

$$S_{magnitude-diff} = \text{erf}\left(\frac{\Delta^2 f_{rp-max} - 1}{\sigma\sqrt{2}}\right)$$

where erf is the Error Function and $\sigma$ is the standard deviation of the $\Delta^2 f_{rp-max}$. $S_{magnitude-diff-ratio}$ is calculated as $\Delta^2 f_{rp-max}$ over the metric by subject at the reversal point $H_r$. Additionally, $$S_{magnitude-diff-ratio} = \min\left(\frac{\Delta^2 f_{rp-max}}{H_r}, 1\right).$$

Having both $S_{magnitude-diff}$ and $S_{magnitude-diff-ratio}$ can take the metric on a particular subject into consideration and avoid a big $S_{significance}$ caused by too small $H_r$. Some properties of this calculation include

- $0 < S_{magnitude-diff} < 1$ and increases with $\Delta^2 f_{rp-max}$ decrease with $H_r$.
- $0 < S_{magnitude-diff-ratio} \le 1$ and increases with $\Delta^2 f_{rp-max}$ and decreases with $H_r$.
- $0 < S_{significance} < 1$ and increases with $\Delta^2 f_{rp-max}$ and decreases with $H_r$.

The result is an algorithm that effectively detects and ranks reversal points in time series data and does so in a way that is scalable for large online networks. In prior art software solutions, reversal points were identified without using first order derivatives, thus necessitating comparison operations to compare the values of the metric at each successive pair of time points to determine whether a reversal point existed at one of the time points in the pair. These comparison operations are computationally expensive when performed at large scale. Additionally, no analysis of the importance of a reversal point was performed in prior art software solutions, and rather all identified reversal points would be displayed, which would be overwhelming for a viewer of large amounts of time series data. Thus, this provides technical improvements over prior art software solutions that may accomplish the same overall goal of identifying important data points in time series data but are not able to scale their solutions for large online networks.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

In some embodiments, the networked system 102 may comprise functional components of an online network. FIG.

2 is a block diagram showing the functional components of an online network, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

Figure 2:
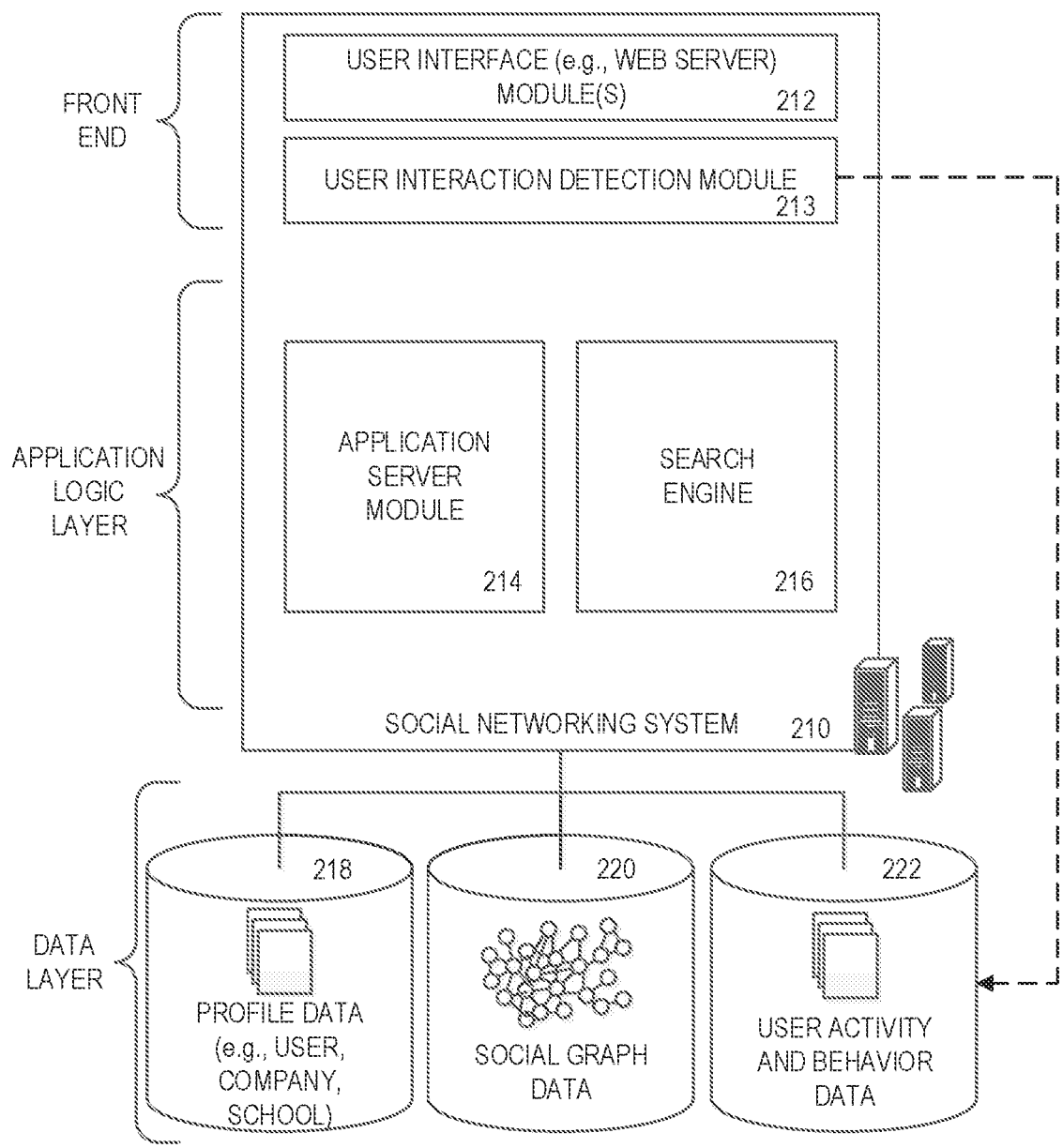
FIG. 2 is a block diagram showing the functional components of an online network, including a data processing module referred to herein as a search engine, for use in generating and providing search results for a search query, consistent with some embodiments of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the online network.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the online network, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the online network, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the online network. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the online network, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, a social networking system 210 provides an API module via which applications 120 and services can access various data and services provided or maintained by the online network. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the online network, nothing other than data privacy concerns prevents the API from being provided to the public or to certain third parties under special arrangements, thereby making the navigation recommendations available to third-party applications 128 and services.

Although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the online network, such as the indexing and searching for data or information contained in the data layer, such as profile data (stored, e.g., in the profile database 218), social graph data (stored, e.g., in a social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
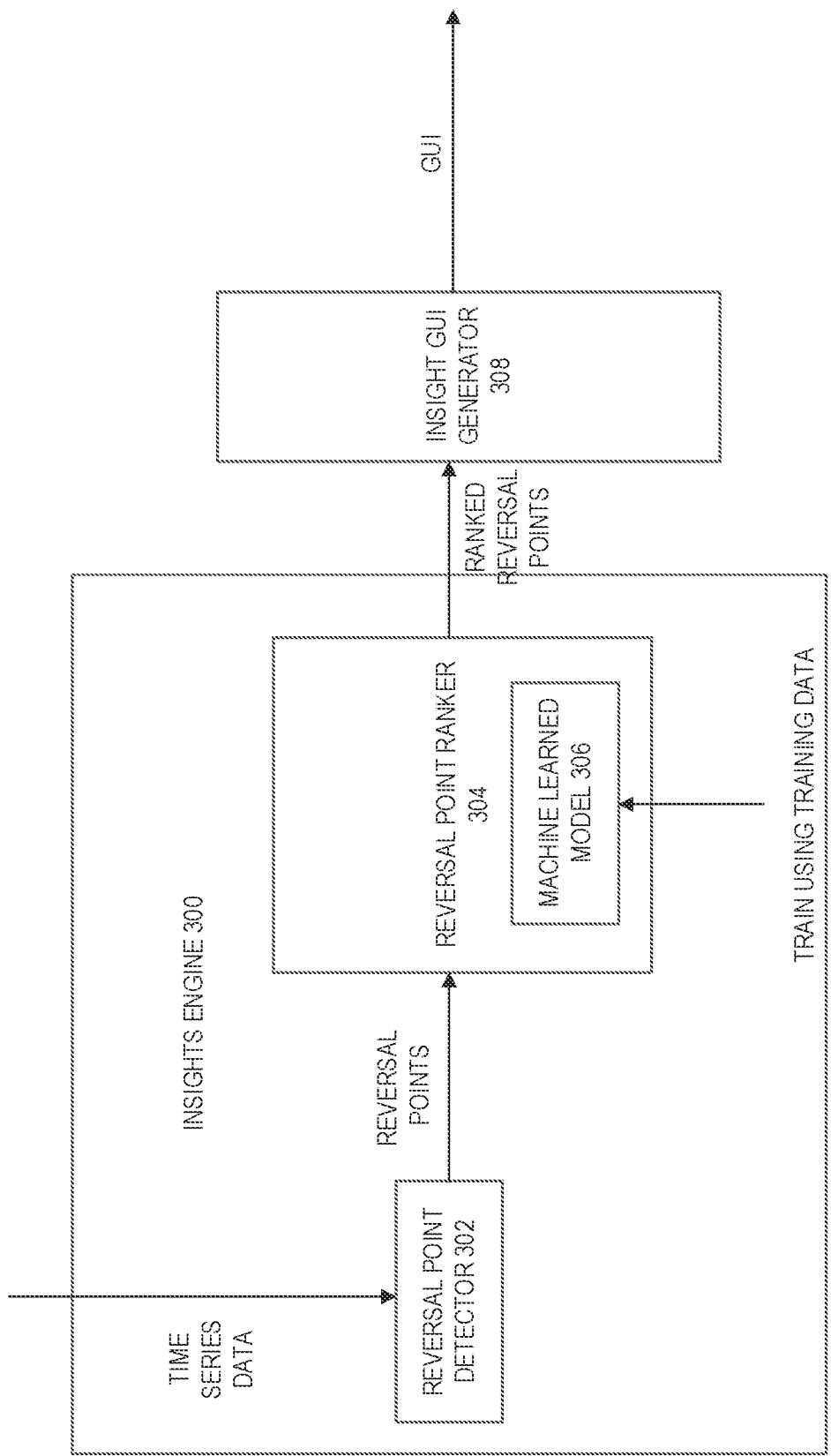
FIG. 3 is a block diagram illustrating the application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, only those components that are relevant to the present disclosure are depicted in FIG. 3.

An insights engine 300 may generate one or more insights regarding data obtained from one or more databases. These databases may include, for example, profile database 218, social graph database 220, and/or user activity and behavior database 222, among others. In an example embodiment, the insights engine 300 may include a reversal point detector 302 and a reversal point ranker 304. The reversal point detector 302 specifically identifies reversal points in discrete time series data obtained from the one or more databases. The reversal point ranker 304 ranks the identified reversal points, using a model. In an example embodiment, the model is a machine learned model 306 trained by a machine learning algorithm to generate a score for one or more of the identified reversal points. The reversal point ranker 304 may then rank the reversal points based on their corresponding scores.

In an example embodiment, the model implements the algorithm described earlier, specifically:

$$S_{overall} = \alpha * S_{abnormality} + (1 - \alpha) * S_{significance}$$

where $$S_{abnormality} = \frac{1}{2} + \frac{R - C}{2N - 4} \text{ and}$$

$$S_{significance} = \beta * S_{magnitude-diff} + (1 - \beta) * S_{magnitude-diff-ratio}$$

In one example embodiment, the values for α and β are heuristically set by an administrator. In another example embodiment, the values for α and β are learned via a machine learning algorithm. Learning these values using a machine learning algorithm allows for the values to be personalized for users, such that when one user views reversal points in a graphical user interface the user may see fewer or more reversal points than other users may see based on the likelihood that the user will select on the reversal points. Adjusting α and β causes the reversal detection machine learned model to become either more sensitive or less sensitive when determining which reversal points are "important", and thus having these values learned based on prior user interactions allows the user's own tendencies with respect to what are "important" reversal points to be reflected in the model. Specifically, a machine learning algorithm is used to train a machine learned model to output values for α and β, using training data. The training data may, for example, be data obtained from profile database 218, social graph database 220, and/or user activity and behavior database 222, among other data sources. Examples of training data may include user profiles (including features such as location, title, skills, etc.) and user interaction information indicating which types of reversal points or other information the user interacted with in a graphical user interface when the user was previously presented with reversal point or other information in the graphical user interface. This data may be transformed into a format suitable for use as training data by, for example, filtering the data to remove outliers and/or incorrect data, or via the application of one or more normalization functions. The transformed training data may then be fed to a machine learning algorithm to train the machine learned model.

The machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbour, decision trees, and hidden Markov models. Examples of unsupervised learning algorithms include expectation-maximization algorithms, vector quantization, and information bottleneck method. In an example embodiment, a binary logistical regression model is used. Binary logistic regression deals with situations in which the observed outcome for a dependent variable can have only two possible types. Logistic regression is used to predict the odds of one case or the other being true based on values of independent variables (predictors).

A neural network is a deep learning machine learning model that contains layers of interconnected nodes. Each node is a perceptron and is similar to multiple linear regression. The perceptron feeds the signal produced by multiple linear regression into an activation function that may be nonlinear. In a multi-layered perceptron (MLP), perceptrons are arranged in interconnected layers. The input layer collects input patterns. The output layer has classifications or output signals to which input patterns may map.

Hidden layers fine-tune the input weightings until the neural network's margin of error is minimal. The hidden layers extrapolate salient features in the input data that have predictive power regarding the outputs.

In an example embodiment, the machine learned model may also be retrained later based on feedback received by users or based on additional (e.g., new) training data received since the previous training.

Referring back to FIG. 3, the ranking of the reversal points may be passed to an insight GUI generator 308. The insight GUI generator 308 may then generate a GUI to display one or more of the ranked reversal points graphically, based on the ranking. The GUI may take many forms, including a graph in which the top ranked reversal points are highlighted. It should be noted that "top" in this context could be based on a particular set number of top reversal points to highlight (e.g., top 10 ranked reversal points) or may be based on the score itself, where only reversal points with scores transgressing a predetermined threshold being highlighted.

Additionally, in an example embodiment, the threshold may be dynamically adjusted as opposed to predetermined and may be personalized based on a number of factors. For example, in one example embodiment, each company's data could potentially have its own threshold, set independently of other companies' thresholds. In another example embodiment, the threshold may be determined based on the viewing user, and possibly could be output from a machine learned algorithm trained to generate a value representing a "best" threshold for a user with the same attributes as the viewing user. For example, certain users may be more likely to be interested in small variations in the underlying data than other users, and thus these certain users (or users like these certain users) may be dynamically assigned a lower threshold than other users. These preferences may be learned by examining user interaction data in the training data, which would indicate which users (and type of users) selected on reversal points with small variations and which users (and type of users) did not select on reversal points with small variations).

Figure 4:
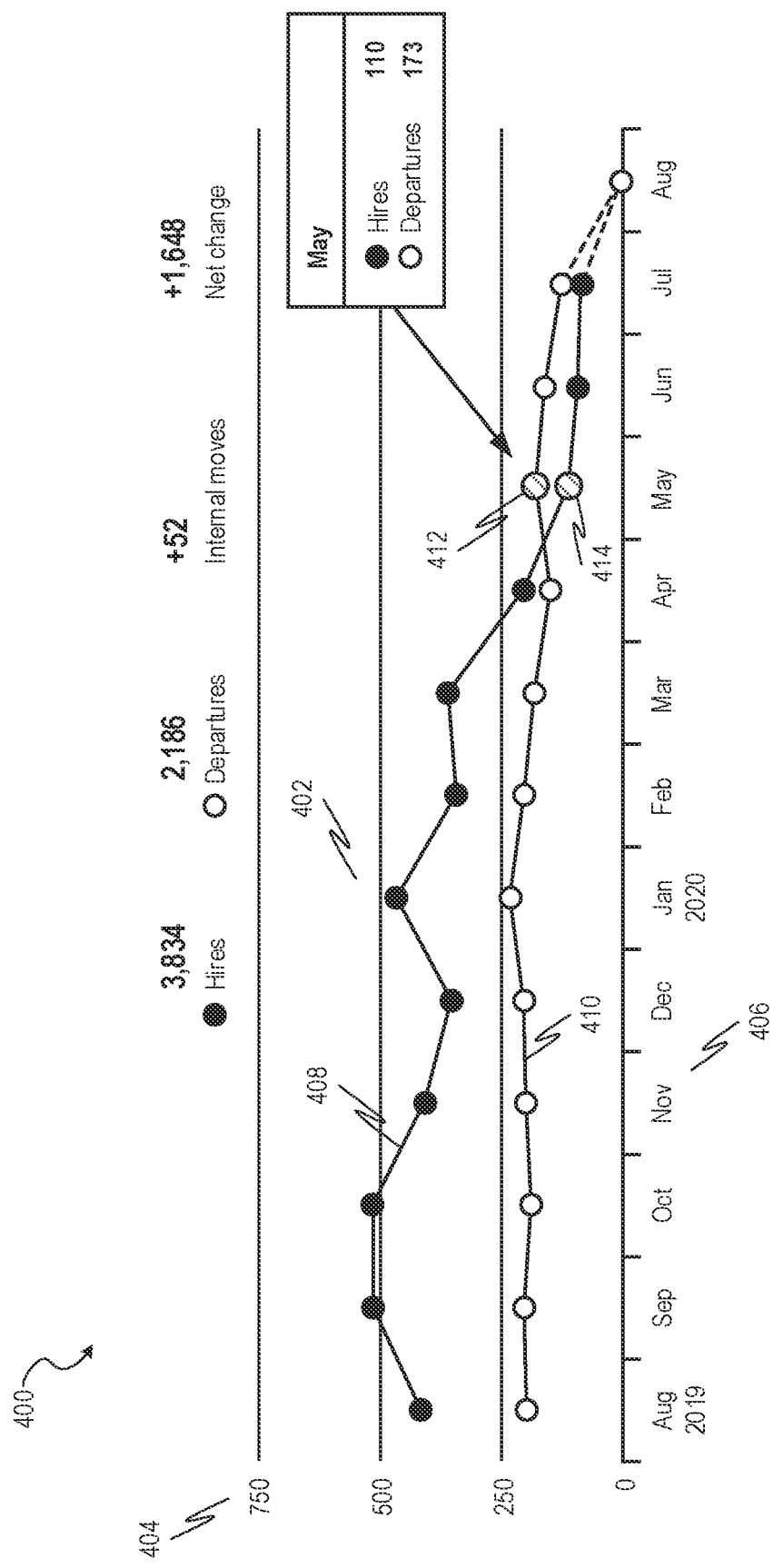
FIG. 4 is a screen capture illustrating a Graphical User Interface (GUI) displaying a graph of hires and departures, in accordance with an example embodiment.

It should also be noted that the reversal points need not be displayed on a graph that technically reflects them as reversal points with respect to a sign change on an axis of the displayed graph. In other words, while a reversal point may be identified based on a change in sign of some metric, the graph on which the reversal point is displayed may reflect a different (albeit related) metric. FIG. 4 is a screen capture illustrating such an embodiment.

FIG. 4 is a screen capture illustrating a GUI 400 displaying a graph 402 of hires and departures, in accordance with an example embodiment. Notably, the GUI 400 displays a graph showing value of a metric (starting with zero) on the y-axis 404, with months on the x-axis 406. The plotted points (and connected lines) include two separate time series, the first being hires 408 and the second being departures 410. The metric used to calculate reversal points, however, is net headcount, the first order derivative of which is hires minus departures. Thus, the reversal point that occurs in May 2020 due to a number of hires falling below number of departures is displayed as two highlighted points 412, 414, despite it being a single reversal point of a different metric.

Figure 5:
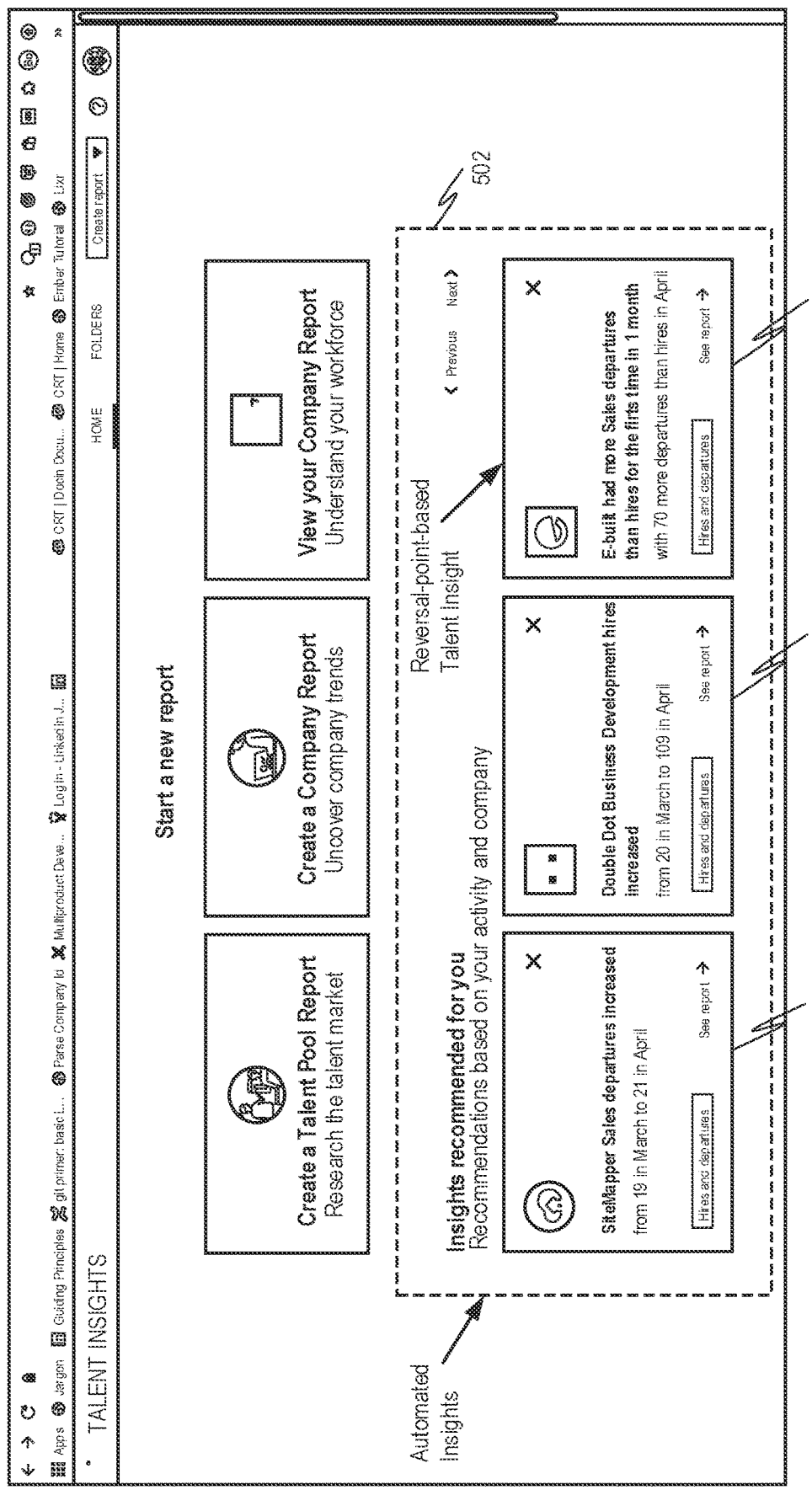
FIG. 5 is a screen capture illustrating a GUI having a first area where automatic insights are displayed.

In an example embodiment, the insight GUI generator 306 may generate a GUI to display a number of different types of insights, of which reversal point insights are only one example. FIG. 5 is a screen capture illustrating a GUI 500 having a first area 502 where automatic insights are displayed. The first area 502 includes insights 504, 506, 508. Of these insights 504, 506, 508, only insight 508 is related to a reversal point. Selecting on insight 508 in the GUI 500 launches another GUI that reveals specifically the reversal points of interest.

Figure 6:
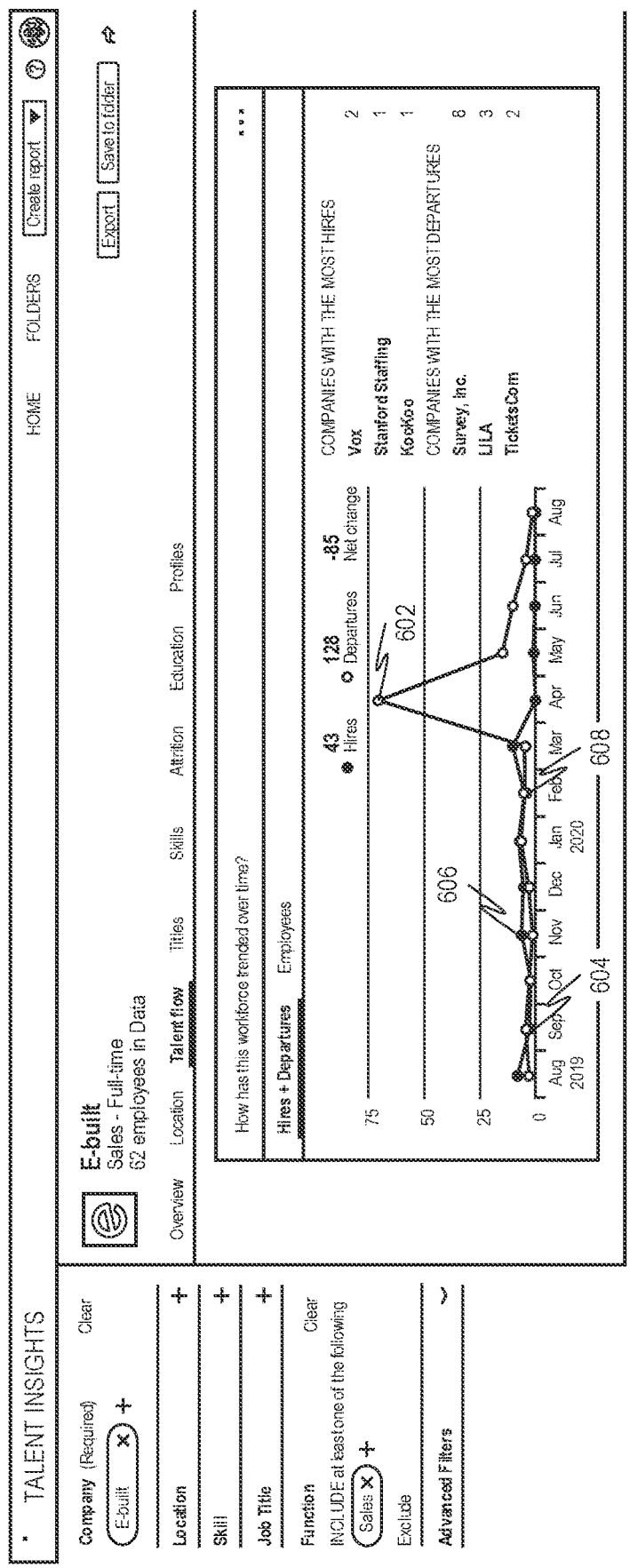
FIG. 6 is a screen capture illustrating a GUI having a first area where a reversal point is highlighted.

FIG. 6 is a screen capture illustrating a GUI 600 having a first area where a reversal point 602 is highlighted. Notably, there are other reversal points, such as reversal points 604, 606, 608 that are not highlighted. This may be because the significance of reversal points 604, 606, 608 has been ranked significantly below reversal point 602. Indeed, as can be seen, the net headcount at reversal points 604, 606, 608 did not change that much from prior months or prior trends, and thus the significances of reversal points 604, 606, 608 are not as great as that of reversal point 602, which clearly represents a significant change in magnitude and trend.

Figure 7:
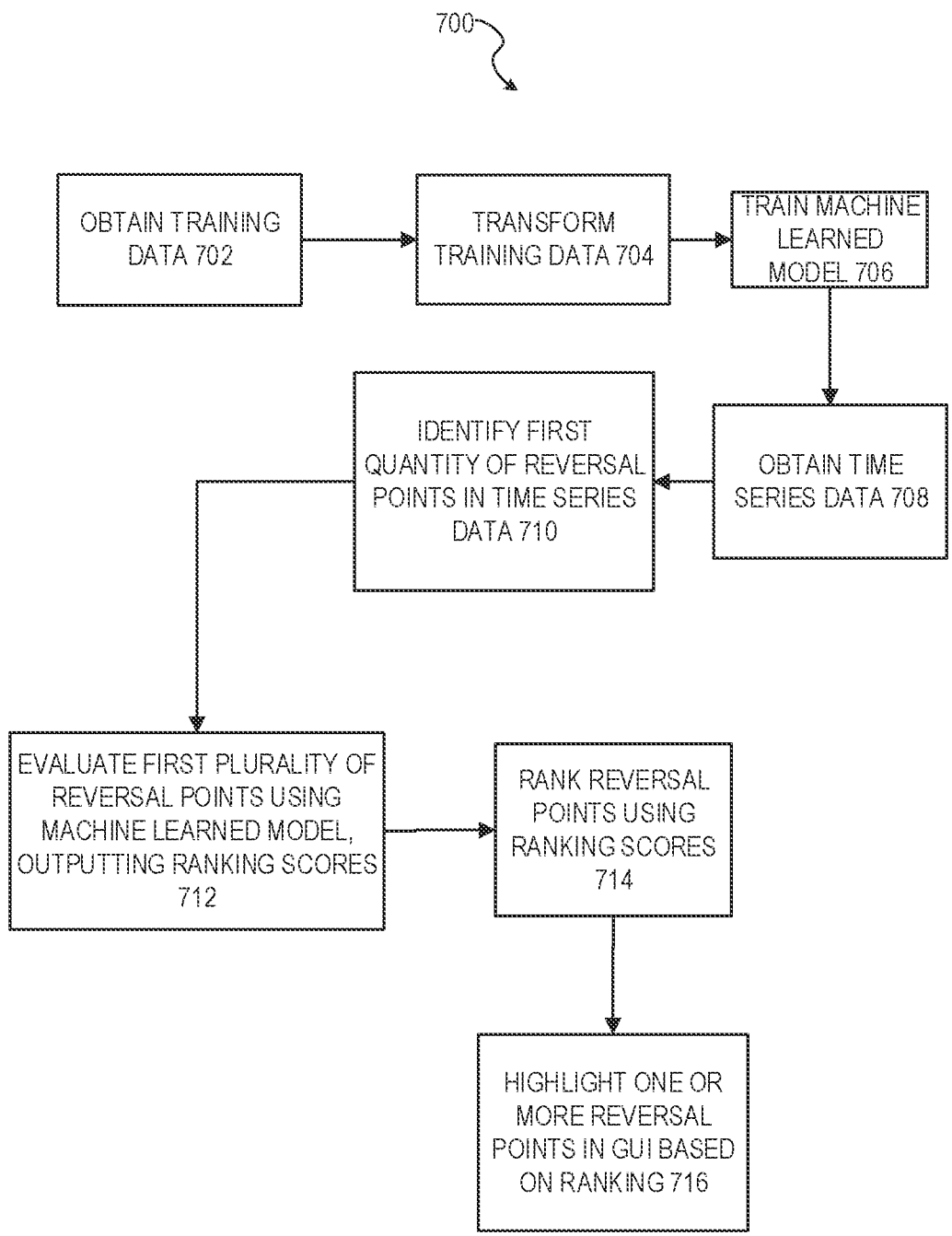
FIG. 7 is a flow diagram illustrating a method of training a machine learned model using a machine learning algorithm, in accordance with an example embodiment.

FIG. 7 is a flow diagram illustrating a method 700 of training a machine learned model using a machine learning algorithm, in accordance with an example embodiment.

At operation 702, training data is obtained from one or more databases. At operation 704, the training data is transformed. As described earlier, this may involve operations such as filtering the training data or normalizing the training data, among others. At operation 706, the transformed training data is used to train a machine learned model, using a machine learning algorithm. The training involves learning one or more weights to be applied to various variables and constants within a ranking score algorithm. The output of the training is the weights, and then when the machine learned model is used to evaluate a reversal point, a ranking score for the reversal point is generated. The ranking score is based on a first weight applied to an abnormality score and a significance score, the abnormality score calculated by determining a difference between a previous trend length and the first quantity, and dividing the difference by a value computed based on a total number of time points in the time series data, the significance score calculated by determining a maximum absolute value of differences between a magnitude change at the corresponding reversal point and those magnitude changes in a previous trend. A trend is a sequence of time points at which the value for the first metric maintained a same sign.

At operation 708, time series data is obtained, the time series data including a value for a first metric at each of a plurality of time points separated by time intervals. At operation 710, a first quantity of reversal points are identified in the time series data, a reversal point being a time point at which the value for the first metric changed from positive to negative or vice-versa. At operation 712, a first plurality of the first quantity of reversal points are evaluated by passing each of the first plurality of reversal points into the machine learned model, thus outputting a ranking score for each of the first plurality of reversal points.

At operation 714, the reversal points in the first plurality of the first quantity of reversal points are ranked based on their corresponding ranking scores. At operation 716, one or more of the reversal points are highlighted in a GUI based on the ranking.

Figure 8:
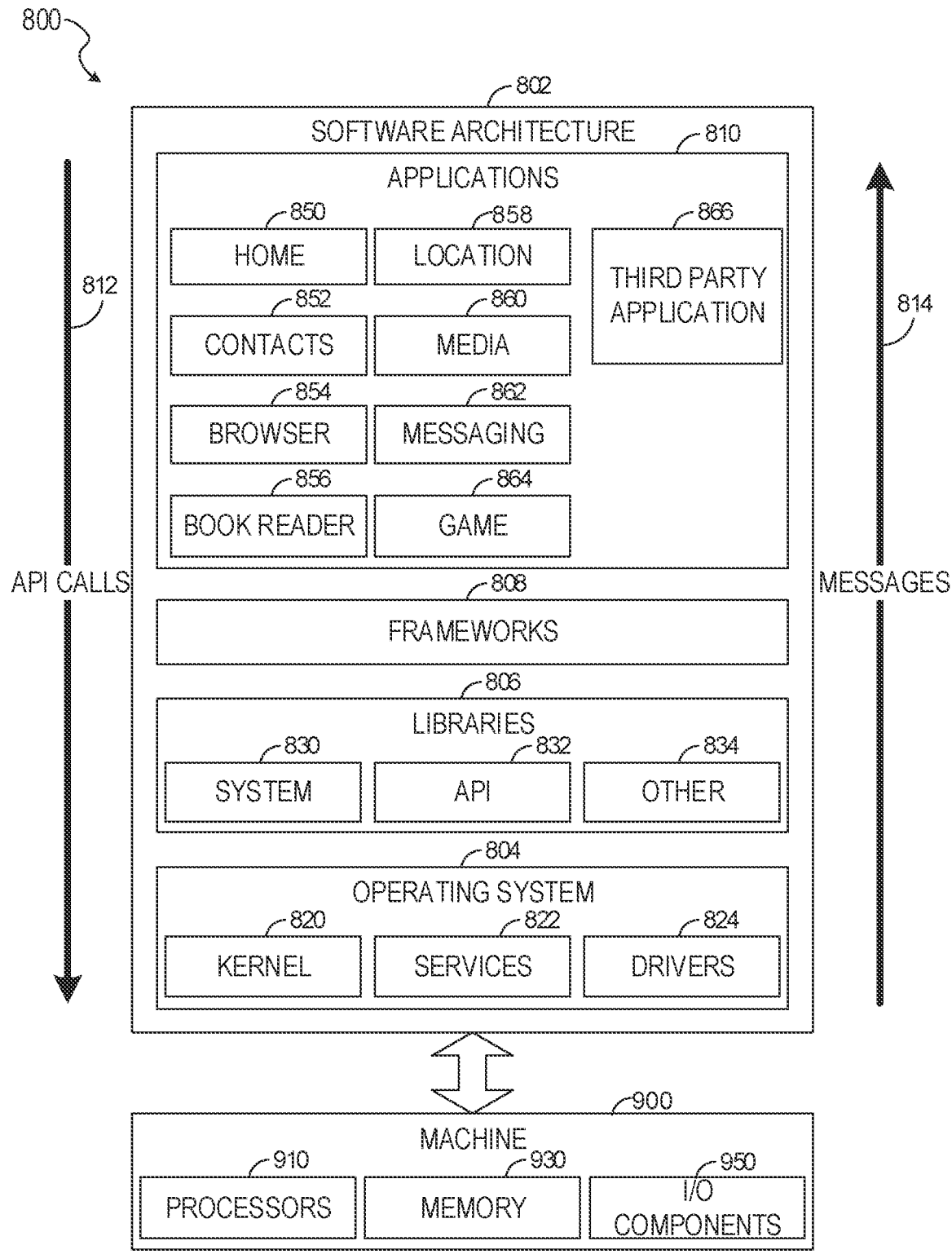
FIG. 8 is a block diagram illustrating a software architecture, in accordance with an example embodiment.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
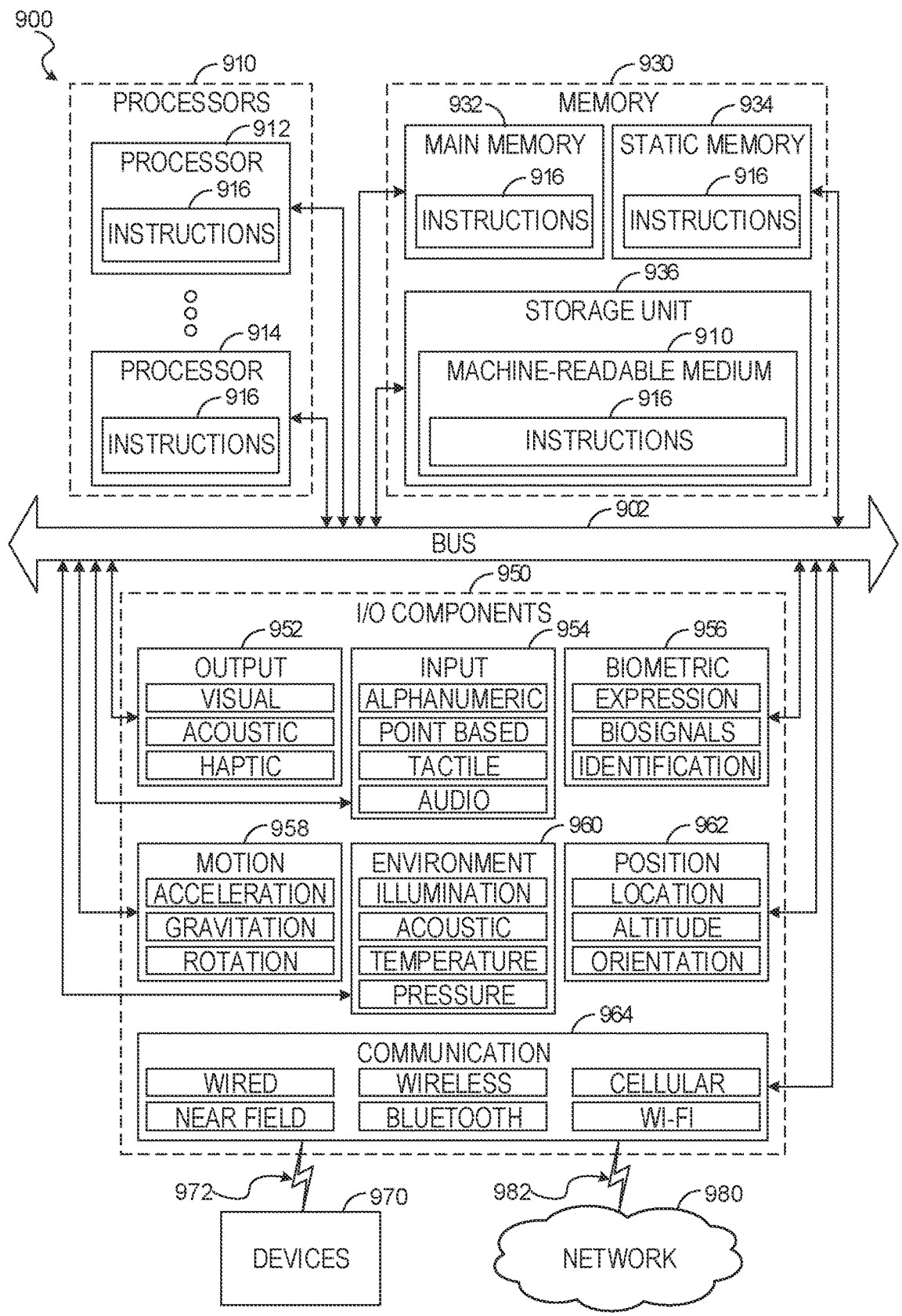
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein may be executed. For example, the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors 912 (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor), multiple processors 910 with a single core, multiple processors 910 with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific 110 components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to the processors 910. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for training and using a machine learned model, comprising:
    a non-transitory computer-readable medium having instructions stored thereon, which, when executed by a processor, cause the system to perform operations comprising:
    obtaining time series data, the time series data including a value for a first metric at each of a plurality of time points separated by time intervals;
    identifying, in the time series data, a plurality of reversal points, a reversal point being a time point at which the value for the first metric changed from positive to negative or vice-versa;
    obtaining training data from one or more databases;
    training a machine learned model, using the training data as input to a machine learning algorithm, to generate a ranking score for an input reversal point, the ranking score being based on:
    calculating an abnormality score by:
        determining a difference between a length of a trend, prior to the input reversal point, in a segment of the time series containing the input reversal point and a total number of reversal points in a plurality of reversal points in the segment, wherein a trend is a sequence of time points at which the value for the first metric maintained a same sign;
        dividing the difference by a value computed based on a total number of time points in the segment;
    calculating a significance score by:
        determining a maximum absolute value of differences between a magnitude change at the input reversal point and those magnitude changes in the trend in the segment prior to the input reversal point, applying a constant β to the maximum absolute value, β learned via the training of the machine learning model;
    applying a first weight to the abnormality score and a value related to the first weight to the significance score; and
    combining the weighted abnormality score and weighted significance score into the ranking score;
    evaluating one or more of the plurality of reversal points by passing each of the one or more reversal points to the machine learned model, thus outputting a ranking score for each of the one or more of the plurality of reversal points;
    ranking the one or more of the plurality of reversal points based on their corresponding ranking scores; and
    highlighting one or more of the reversal points in a graphical user interface based on the ranking.

2. The system of claim 1, wherein the operations further comprise retraining the machine learned model based on user feedback.

3. The system of claim 1, wherein the applying the first weight is performed using the following formula:

$$S_{ranking} = \alpha * S_{abnormality} + (1-\alpha) * S_{significance}$$

wherein S is the ranking score, $S_{abnormality}$ is the abnormality score, $S_{significance}$ is the significance score, and α is the first weight.

4. The system of claim 3, wherein $$S_{abnormality} = \frac{1}{2} + \frac{R-C}{2N-4}$$

where R is the previous trend length, C is the total number of reversal points in the plurality of reversal points, and N is the total number of time points in the time series data.

5. The system of claim 3, wherein $$S_{significance} = \beta * S_{magnitude-diff} + (1-\beta) * S_{magnitude-diff-ratio}$$

where β is a second weight, $$S_{magnitude-diff} = \mathrm{erf}\left(\frac{\Delta^2_{frp-max}-1}{\sigma\sqrt{2}}\right) \text{ and}$$

$$S_{magnitude-diff-ratio} = \min\left(\frac{\Delta^2_{frp-max}}{H_r}, 1\right)$$

where erf is an error function, σ is a standard deviation of $\Delta^2 f_{rp\text{-}max}$, and $H_r$ is a size of a company for which the time series data applies.

6. The system of claim 1, wherein the one or more highlighted reversal points are highlighted on a graph representing a second metric different than the first metric.

7. The system of claim 1, wherein the training data includes features extracted from user profiles and user interaction data corresponding to the user profiles and the training data is transformed prior to it being used to train the machine learned model.

8. The system of claim 1, wherein the machine learning algorithm is a neural network.

9. A computerized method comprising:
obtaining time series data, the time series data including a value for a first metric at each of a plurality of time points separated by time intervals;
identifying, in the time series data, a plurality of reversal points, a reversal point being a time point at which the value for the first metric changed from positive to negative or vice-versa;
obtaining training data from one or more databases;
training a machine learned model, using the training data as input to a machine learning algorithm, to generate a ranking score for an input reversal point, the ranking score being based on:
calculating an abnormality score by:
determining a difference between a length of a trend, prior to the input reversal point, in a segment of the time series containing the input reversal point and a total number of reversal points in a plurality of reversal points in the segment, wherein a trend is a sequence of time points at which the value for the first metric maintained a same sign;
dividing the difference by a value computed based on a total number of time points in the segment;
calculating a significance score by:
determining a maximum absolute value of differences between a magnitude change at the input reversal point and those magnitude changes in the trend in the segment prior to the input reversal point, applying a constant β to the maximum absolute value, β learned via the training of the machine learning model;
applying a first weight to the abnormality score and a value related to the first weight to the significance score; and
combining the weighted abnormality score and weighted significance score into the ranking score;
evaluating one or more of the plurality of reversal points by passing each of the one or more reversal points to the machine learned model, thus outputting a ranking score for each of the one or more of the plurality of reversal points;
ranking the one or more of the plurality of reversal points based on their corresponding ranking scores; and
highlighting one or more of the reversal points in a graphical user interface based on the ranking.

10. The method of claim 9, further comprising retraining the machine learned model based on user feedback.

11. The method of claim 9, wherein the applying the first weight is performed using the following formula:

$$S_{ranking} = \alpha * S_{abnormality} + (1-\alpha) * S_{significance}$$

wherein S is the ranking score, $S_{abnormality}$ is the abnormality score, $S_{significance}$ is the significance score, and α is the first weight.

12. The method of claim 11, wherein $$S_{abnormality} = \frac{1}{2} + \frac{R-C}{2N-4}$$

where R is the previous trend length, C is the total number of reversal points in the plurality of reversal points, and N is the total number of time points in the time series data.

13. The method of claim 12, wherein $$S_{significance} = \beta * S_{magnitude-diff} + (1-\beta) * S_{magnitude-diff-ratio}$$

where β is a second weight, $$S_{magnitude-diff} = \text{erf}\left(\frac{\Delta^2_{frp-max} - 1}{\sigma\sqrt{2}}\right) \text{ and}$$

$$S_{magnitude-diff-ratio} = \min\left(\frac{\Delta^2_{frp-max}}{H_r}, 1\right)$$

where erf is an error function, σ is a standard deviation of $\Delta^2 f_{rp\text{-}max}$, and $H_r$ is a size of a company for which the time series data applies.

14. The method of claim 9, wherein the one or more highlighted reversal points are highlighted on a graph representing a second metric different than the first metric.

15. The method of claim 9, wherein the training data includes features extracted from user profiles and user interaction data corresponding to the user profiles and the training data is transformed prior to it being used to train the machine learned model.

16. The system of claim 9, wherein the machine learning algorithm is a neural network.

17. A non-transitory machine-readable storage medium comprising instructions which, when implemented by one or more machines, cause the one or more machines to perform operations comprising:
obtaining time series data, the time series data including a value for a first metric at each of a plurality of time points separated by time intervals;
identifying, in the time series data, a plurality of reversal points, a reversal point being a time point at which the value for the first metric changed from positive to negative or vice-versa;
obtaining training data from one or more databases;
training a machine learned model, using the training data as input to a machine learning algorithm, to generate a ranking score for an input reversal point, the ranking score being based on:
calculating an abnormality score by:
determining a difference between a length of a trend, prior to the input reversal point, in a segment of the time series containing the input reversal point and a total number of reversal points in a plurality of reversal points in the segment, wherein a trend is a sequence of time points at which the value for the first metric maintained a same sign;
dividing the difference by a value computed based on a total number of time points in the segment;
calculating a significance score by:
determining a maximum absolute value of differences between a magnitude change at the input reversal point and those magnitude changes in the trend in the segment prior to the input reversal point, applying a constant β to the maximum absolute value, β learned via the training of the machine learning model;

applying a first weight to the abnormality score and a value related to the first weight to the significance score; and combining the weighted abnormality score and weighted significance score into the ranking score;

evaluating one or more of the plurality of reversal points by passing each of the one or more reversal points to the machine learned model, thus outputting a ranking score for each of the one or more of the plurality of reversal points;

ranking the one or more of the plurality of reversal points based on their corresponding ranking scores; and highlighting one or more of the reversal points in a graphical user interface based on the ranking.

18. The non-transitory machine-readable storage medium of claim 17, wherein the operations further comprise retraining the machine learned model based on user feedback.

* * * * *